Aug. 30, 1966     D. M. DENHAM     3,269,527
MATERIAL FEEDING APPARATUS
Filed Oct. 20, 1964     2 Sheets-Sheet 1
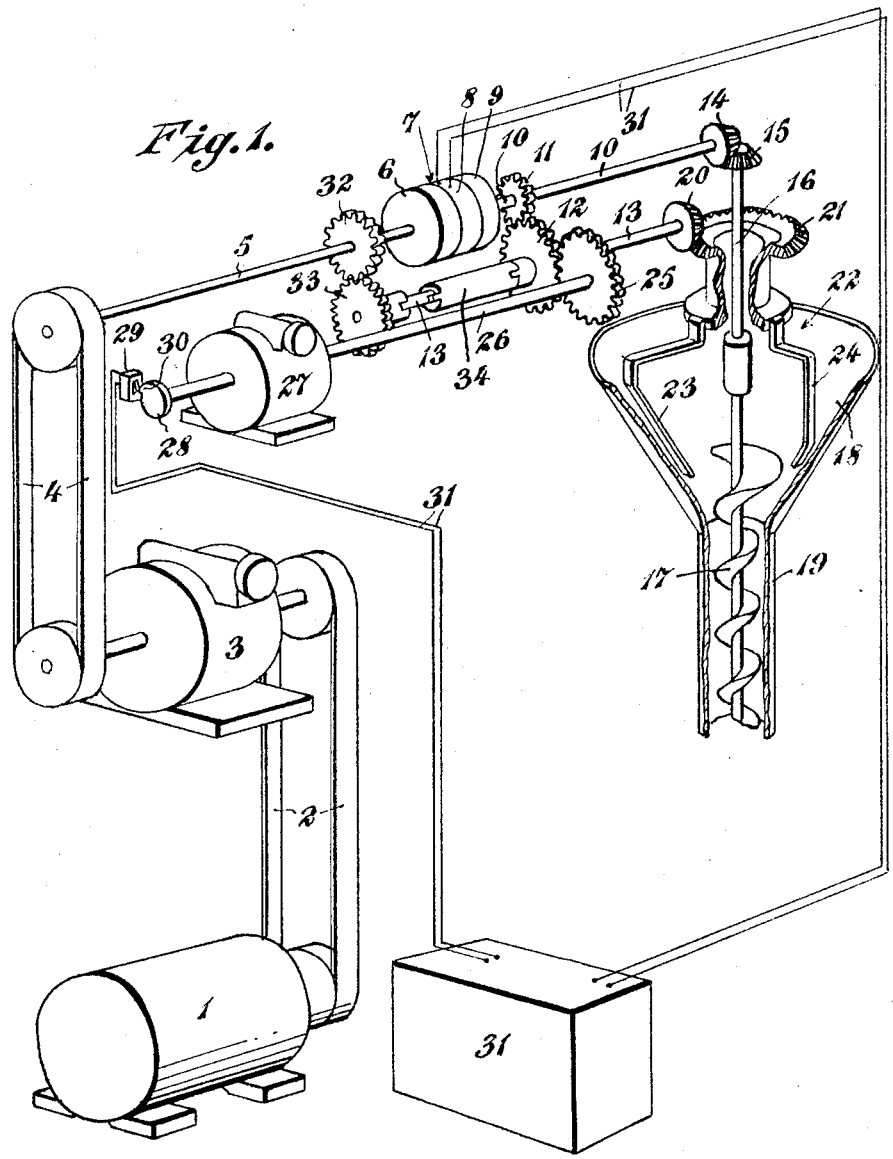
INVENTOR
DEREK MALCOLM DENHAM
Attys. NORRIS & BATEMAN

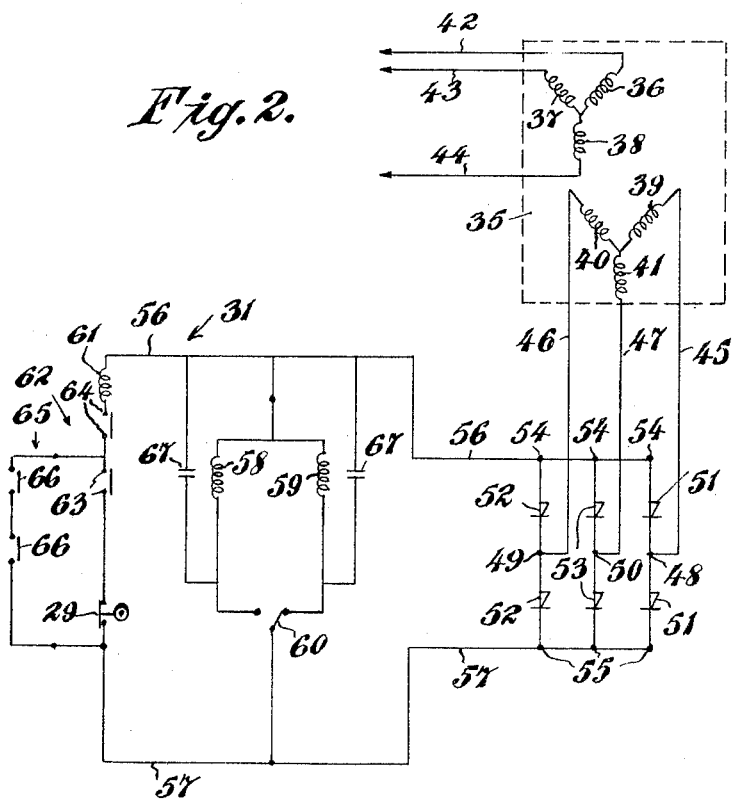

333,269,527
MATERIAL FEEDING APPARATUS
Derek Malcolm Denham, Shirley, Solihull, England, assignor to Southall & Smith Limited, Birmingham, England, a British company
Filed Oct. 20, 1964, Ser. No. 405,209
Claims priority, application Great Britain, Oct. 23, 1963, 41,723/63
3 Claims. (Cl. 198—213)

This invention relates to material feeding apparatus and has for its principal object to improve the accuracy of control of an electromagnetically operated clutch/brake mechanism.

In accordance with the invention a material feeding apparatus comprises:
(1) Driving means,
(2) An electromagnetically operated clutch/brake mechanism coupled to be driven by said driving means,
(3) A feed auger coupled for driving by said electromagnetically operated clutch/brake mechanism,
(4) An electrical circuit connected to effect said electromagnetic operation of the clutch/brake mechanism, and
(5) Means for feeding to the electrical circuit a D.C. current composed of the individually rectified phases of a three phase power supply.

A typical example of the practical realisation of the invention will now be described with reference to the accompanying drawings wherein:
FIGURE 1 is a schematic view of the apparatus; and
FIGURE 2 is a circuit diagram.

Referring to the drawings a volumetric material feeding apparatus comprises an electric drive motor 1 connected through belt 2 to a variable speed gear box 3 in turn connected through a belt 4 to a driving shaft 5. The driving shaft 5 is connected to the driving clutch member 6 of an electromagnetically operated clutch/brake mechanism 7.

The clutch/brake mechanism 7 comprises two further members 8 and 9 co-axially disposed with respect to the driving clutch member 6, i.e., a fixed brake member 9, and a driven armature member 8 axially slidable between alternative contact with the driving member 6 or with the fixed brake member 9. A suitable clutch/brake mechanism 7 is that known commercially as a "Westool SF 500" clutch and brake unit. The driven member 8 is coupled to an output shaft whereby, according to the axial position of the driven member 8, the output shaft 10 is either drivable from the driving shaft 5, or is braked.

The output shaft 10 carries an output pinion 11 fast thereon which meshes in 3 to 1 ratio with a lay pinion 12 rotatably mounted on a lay shaft 13. The output shaft 10 also carries a bevel gear 14 meshing with an identical bevel gear 15 on a feeding shaft 16. The feeding shaft 16 is coupled to an auger screw 17 for feeding material from a hopper 18 through a cylindrical feed tube 19 leading from the hopper 18, so that a given rotation of the auger screw 17 effects a proportional volumetric delivery of material from said feed tube 19.

The lay shaft 13 is connected through bevel gears 20 and 21 of 3 to 1 ratio with a stirring device 22 including two arms 23 and 24 depending into the hopper 18. The lay pinion 12 rotatably mounted on lay shaft 13 is meshed in 1 to 1 ratio with a gear box pinion 25 fast on a timing shaft 26 leading through an infinitely variable gear box 27 to and rotatable with a profile cam 28 so that rotation of the output shaft 10 to feed material through the feed tube 19 simultaneously rotates the lay pinion 12 at a third of the output shaft speed and rotates the profile cam 28 at a ratio of said third of the output shaft speed determined by the infinitely variable gear box 27.

A suitable infinitely variable gear box is known as a Kopp gear box which in one particular example is capable of producing an infinite number of gear ratios in the range between ⅓ to 1 and 1 to 3. Hence, in this example, any ratio between 1 and 9 full turns of the output shaft 10 can be obtained for one full turn of the profile cam 28 according to the setting of the infinitely variable gear box 27.

The rotatable profile cam 28 is associated with switching means comprising a microswitch 29 located for actuation by a single lobe 30 on said cam 28. The microswitch 29 is connected through an electrical control circuit 31 more fully described below for controlling the electromagnetic operation of the clutch/brake mechanism 7.

A driving pinion 32 is fast on the driving shaft 5 and is meshed in 5 to 3 ratio with a driven pinion 33 rotatably mounted on the lay shaft 13. A dog clutch 34 is disposed between the driven pinion 33 and the lay pinion 12, and is operable to connect either of said pinions 33 or 12 with the lay shaft 13. When the driven pinion 33 is connected to the lay shaft 13 the lay shaft 13 is operated with the driving shaft 5 to actuate the stirring device 22. When the lay pinion 12 is connected to the lay shaft 13 actuation fo the stirring device 22 is only effected with operation of the output shaft 10 and the rotation of the auger screw 17.

In use, with the hopper 18 filled with the material to be fed by the auger screw 17 and the drive motor 1 and energised, the motor 1 continually rotates the driving clutch member 6 at a speed determined by the motor 1 and the gear box 3, said speed being that desired for the feed auger 17. To commence a feeding cycle, the armature member 8 of the clutch/brake mechanism 7 is actuated through the electric control circuit 31 and is slid axially out of engagement with the brake member 9 into engagement with the driving clutch member 6 to rotate the output shaft 10 and hence the feed auger 17. Simultaneously the profile cam 28 is rotated from a predetermined starting position at a speed in a ratio to that of the output shaft 10 determined by the setting of the infinitely variable gear box 27 from an initial position to a position where the microswitch 29 is actuated by the lobe 30. This actuation causes the armature member 8 to be disengaged from the driving clutch member 6 and to be engaged with the brake member 9. The feed auger 17 is thus stopped, having turned through a controlled number of revolutions and part revolutions to feed the desired volumetric amount of material.

In accordance with the present invention the control circuit 31 shown in the accompanying circuit diagram includes a three-phase transformer 35 having three star-connected primary windings 36–38 and three star-connected secondary windings 39–41. The primary windings 36–38 are fed from a three-phase supply 42–44. Each of the separate phase output lines 45–47 leading from the secondary windings 39–41 of the transformer 35 is connected to the corresponding one of the common terminals 48–50 of three pairs 51–53 of series connected rectifier cells. The two outer terminals 54 and 55 of each pair of rectifier cells are connected to the corresponding terminals of the other two pairs of rectifier cells to carry a D.C. power output between leads 56 and 57.

The leads 56 and 57 are bridged through either one of two capacitors 67 of suitable capacitance such as .25 microfarad and apply the D.C. power output across either an energising coil 58 for urging the armature member 8 of the clutch brake mechanism 7 into driven contact with the driving clutch member 6, or an energising coil 59 for urging the armature member 8 into braking contact with the fixed brake member 9. A switch 60 determines whether the power output is applied across coil 58 or coil 59, and is controlled and actuated by a relay coil 61 in a series circuit 62 including the microswitch 29, holding contacts 63 also controlled by the relay coil 61, and a pair of terminals 64. The series circuit 62 has the leads 56 and 57 applied thereacross, and incorporates a starting circuit 65 with two interlocks 66 bridging the microswitch 29 and the holding contacts 63.

The operation of the control circuit 31 is as follows. The switch 60 is in the position shown at the beginning of each feeding cycle, with current passing through the brake coil 59 to hold the output shaft 10, and hence the auger screw 16, braked. In this condition the microswitch 29 is closed, the contacts 64 are closed (this being made upon initiation of the drive motor 1), and the contacts 63 and interlocks 66 are open. As the circuit 31 is readied, to commence feeding, by external circuits, not shown, such as from an operator's switch, or a weighing device, for example, the interlocks 66 are closed to permit passage of current through the relay coil 61. The relay coil 61 closes the holding contacts 63 and actuates the switch 60 to pass current through the clutch control coil 58. This causes the armature member 8 of the clutch/brake mechanism 7 to move into driven contact with the clutch member 6 of the mechanism 7, and so effects rotation of the auger 17.

As the auger 17 rotates the profile cam 28 is turned through the gear box 27 until eventually the microswitch 29 is opened to break the circuit through the series circuit 62. This causes the holding contacts 63 to open and the switch 60 to be actuated by the relay coil 61 to brake the feed auger 17 once more. The number of complete and part revolutions effected by the auger 17 are controlled by the profile cam 28 to a variable extent by the gear box 27.

The use of direct current supply to the leads 56 and 57, with any ripple of low amplitude (of the order of 5% of the mean voltage in one example), is found to be particularly advantageous in that the response of the control circuit 31 and the clutch/brake mechanism 7 is negligibly variable with the disposition of phase in the control circuit 31 at the instant that control is required. Consequently a greater degree of accuracy of control of the feed auger 17 is obtainable than with the conventional use of an A.C. supply with the attendant advantages of greater possible speed of operation and less wastage in excess feed previously required to ensure absence of under feed.

I claim:
1. A material feeding apparatus comprising:
    (1) rotatable driving means,
    (2) a rotatable feed auger screw,
    (3) an electromagnetically operated clutch/brake mechanism connected between said driving means and said feed auger screw to control drive to the latter,
    (4) an electrical control circuit connected to effect electromagnetic operation of said electromagnetically operated clutch/brake mechanism,
    (5) a three phase alternating current supply,
    (6) three full wave rectifier units respectively connected to full wave rectify each of the three individual phases of said supply, and
    (7) means connecting the outputs of said full wave rectifiers together to feed a resultant substantially smooth direct current to energize said electrical control circuit.

2. A material feeding apparatus according to claim 1, said circuit comprising a three phase transformer having three primary windings connected to the respective phases of said three phase current supply and means connecting the three secondary windings of said transformer to supply the three individual phases to said three rectifier units.

3. A material feeding apparatus according to claim 2, wherein the primary and secondary windings of said transformer are each star coupled.

References Cited by the Examiner
UNITED STATES PATENTS

| | | | |
|---|---|---|---|
| 1,742,434 | 1/1930 | Costello | 198—64 X |
| 2,706,544 | 4/1955 | Schuman | 192—12.2 |
| 2,828,846 | 4/1958 | Viguers | 192—12.2 |

EVON C. BLUNK, *Primary Examiner.*

RICHARD E. AEGERTER, *Examiner.*